United States Patent [19]

Iqbal et al.

[11] Patent Number: 4,935,307
[45] Date of Patent: Jun. 19, 1990

[54] TRANSPARENT COATINGS FOR GRAPHICS APPLICATIONS

[75] Inventors: Mohammad Iqbal, Woodbury; Armin J. Paff, St. Paul, both of Minn.

[73] Assignee: Minnesota Mining and Manufacturing Company, St. Paul, Minn.

[21] Appl. No.: 260,812

[22] Filed: Oct. 21, 1988

[51] Int. Cl.$^5$ .............................................. B05D 5/04
[52] U.S. Cl. .................................... 428/500; 428/515; 524/377; 524/516; 524/521; 524/522; 430/930
[58] Field of Search ............... 524/377, 516, 521, 522; 428/500, 515; 430/930

[56] References Cited

U.S. PATENT DOCUMENTS

| | | | |
|---|---|---|---|
| 3,936,402 | 2/1976 | Keegan et al. | 524/522 |
| 4,152,307 | 5/1979 | Shibahara et al. | 524/377 |
| 4,167,597 | 9/1979 | Yoshida et al. | 428/522 |
| 4,300,820 | 11/1981 | Shah | 351/160 H |
| 4,339,373 | 7/1982 | Robinson | 524/521 |
| 4,369,229 | 1/1983 | Shah | 428/421 |
| 4,404,314 | 7/1983 | Jabloner | 524/521 |
| 4,454,279 | 6/1984 | Ong et al. | 524/522 |

Primary Examiner—Paul R. Michl
Assistant Examiner—Thorl Chea
Attorney, Agent, or Firm—Donald M. Sell; Walter N. Kirn; David L. Weinstein

[57] ABSTRACT

A hydrophilic, polymeric blend which provides improved durability and reduced curl when used as an image-receptive layer on graphic arts films. The blend comprises at least one water-absorbing, hydrophilic polymeric material, at least one hydrophobic polymeric material having acid functionality, and at least one polyethylene glycol. The layer formed from the blend provides high sorption capacity combined with good physical integrity even when wet, along with dimensional stability.

The invention also provides sheets suitable for preparing visual transparencies having a backing bearing on at least one major surface thereof an image-receptive layer formed from the aforementioned blend.

16 Claims, 1 Drawing Sheet

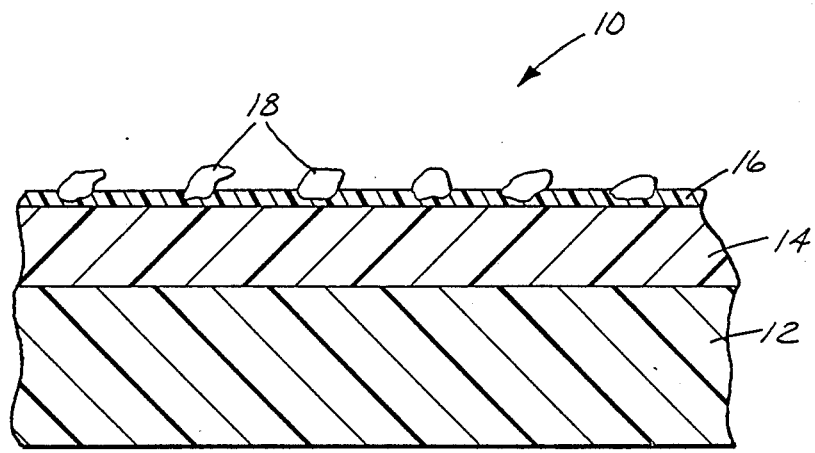

TRANSPARENT COATINGS FOR GRAPHICS APPLICATIONS

BACKGROUND OF THE INVENTION

It is well-known that transparencies for use with overhead projectors can be produced by imagewise deposition of liquid ink of various colors onto thin, flexible, transparent polymeric substrates. Such imagewise ink deposition can be performed by such apparatus as pen plotters and ink jet printers of the type normally used for applying images to paper. In the imaging of paper by such ink deposition methods, the porous nature of the paper is an important factor in the drying of the ink, as well as in the final image quality. In contrast to paper, however, the non-porous nature of transparent, polymeric substrates makes depositing of ink from pen plotters or ink jet printers thereon very difficult, with the result that poor quality images of low durability are formed.

A common characteristic of inks used in pen plotters and ink jet printers is that they are exposed to open air, prior to imaging, for long periods of time. Yet, even after long term exposure to open air, the ink must function in a satisfactory manner, without deterioration, particularly without loss of solvent. In order to meet this requirement, ink formulations typically utilize solvents of very low volatility, such as water, ethylene glycol, propylene glycol, and other like solvents. Because of the low volatility of the solvents in these ink formulations, solvent evaporation as a mechanism for drying the ink after imaging is very limited.

In the case of printing on paper by means of ink jet printers, images are composed of small dots, with the spacing between the dots being of such a magnitude as to allow lateral diffusion of the ink on the substrate to just fill areas between adjacent dots. In the case of printing on film by means of ink jet printers, the situation is quite different, with little or no ink spreading, and with a tendency toward irregular beading up of the ink into droplets of various sizes, with the droplet sizes being unrelated to the intended dot size. When such beading occurs, image quality is diminished.

Problems of ink beading and failure to dry arise because most transparent films suitable for graphics applications, in addition to being non-porous, are also, in many cases, hydrophobic. Imageability of transparent, polymeric film with inks containing solvents of low volatility has been improved by applying hydrophilic, water absorbent, ink-receptive layers to transparent, polymeric film substrates. In addition to absorbing the low volatility solvents found in ink formulations, these layers must exhibit ink-receptivity, durability, non-tackiness, and the image quality required of commonly accepted graphic arts materials.

It is desirable that water-absorbing polymeric compositions retain some degree of physical durability, dryness to the touch, and non-tackiness even after absorbing significant amounts of water or aqueous ink, as would occur in the imaging process. Because polymeric materials have a strong tendency to be softened or even dissolved by the absorption of liquids, the absorption of significant quantities of liquids is inconsistent with retention of physical and handling properties desired in graphic arts materials. Attempts at resolving these apparently conflicting goals, while at the same time meeting the additional requirement of retaining transparency, have often involved the use of polymer blends.

In U.S. Pat. No. 4,503,111, coatings comprising blends of polyvinyl pyrrolidone and either polyvinyl alcohol or gelatin are disclosed. The materials disclosed in U.S. Pat. No. 4,503,111 exhibit good ink-absorption when used in ink jet printers, but tend to be tacky in imaged areas, and at high humidity, exhibit tackiness even in non-imaged areas.

Another undesirable feature of the polymer blends disclosed in that patent is dimensional sensitivity to moisture content, resulting in a tendency for the film to curl when subjected to heating or changes in humidity.

Polymeric blends that are less tacky and moisture-sensitive, but which still maintain water absorptivity, are disclosed in U.S. Pat. Nos. 4,300,820 and 4,369,229, wherein blends of hydrophilic polymers with terpolymers having hydrophobic and hydrophilic parts, along with acid functionalities, are disclosed. Although these patents do not disclose ink-receptive coatings, the polymeric blends disclosed therein have been found useful as water absorbent layers capable of retaining a degree of durability and non-tackiness even after absorbing significant quantities of water. However, U.S. Pat. Nos. 4,300,820 and 4,369,229 do not mention either graphic arts materials or the various properties characterizing image quality which are important in such materials.

European Patent Application No. EP 0 233 703, discloses blends of acrylic polymers with polyvinylpyrrolidone (PVP) for use in ink-receptive layers, wherein compatibility between the hydrophilic PVP and the hydrophobic acrylic polymer is achieved by incorporating carboxylic acid groups into the acrylic polymer. It does not appear possible to adjust the formulations disclosed therein to simultaneously provide adequate drying, low tack, and acceptable lateral migration of ink in many of the commercially available ink jet printers.

In addition to pre-imaging optical requirements, such as clarity, polymeric blends used in transparent ink-receptive layers must also exhibit satisfactory post-imaging quality. It is desirable that the ink dry, tack-free, in a reasonably short time. A typical requirement for drying may be that the imaged sheet be sufficiently dry and tack-free to allow stacking in the time required to image the next sheet. Additionally, considerable spreading of the ink dots is desirable to achieve adequate color density. At the same time, any spreading of ink dots should be adequately controlled so as to produce sharp, smooth lines of demarcation between contrasting colors. It has been found that this combination of features is not readily attainable in a single formulation. For this reason, multi-layer coatings have been found useful.

U.S. Pat. Nos. 4,225,652, 4,301,195, and 4,379,804, disclose ink-receptive materials having multiple layers, with the first, or underlayer, being highly ink-absorbent, and the second, or topcoat, layer, being ink-permeable, while at the same time being quite durable, even after the application of ink. Because the topcoat layer need not retain any significant amount of ink, but merely allow ink to pass through to the underlayer, many of the softening effects resulting from high levels of solvent retention can be avoided in the topcoat layer. Further, since the underlayer, which is softened by the absorption of ink, is protected by the topcoat layer, the overall image is more durable and less tacky. It has been found, however, that when highly water-absorbent materials, such as, for example, polyvinyl pyrrolidone, are used for the ink-absorbent underlayer, the degree of softening which occurs is sufficient to cause severe reduction in the durability of the overall imaged layer, and that topcoating is not sufficient to overcome this reduction in durability. When materials which are less susceptible to softening due to ink-absorption are used for the underlayer, the ink-absorbing ability of the system is likely to be unacceptably low.

Another disadvantage of presently available ink-receptive layers is that their high level of sorption capacity leads to poor dimensional stability, which, in turn, leads to curling of the film whenever moisture content changes, either due to imaging, or due simply to changes in humidity or to drying out due to the heat encountered on the stage of the overhead projector.

Curl can be reduced by applying the same image receptive layer to both sides of the film backing, so that any expansion or contraction is applied symmetrically to both sides of the sheet. This adds to manufacturing cost, and still may not completely eliminate curl, especially in cases where moisture content differs on opposite sides of the film.

Other methods of imparting dimensional stability to moisture sensitive materials include chemical cross-linking, as is done in photographic gelatin coatings, and permanent swelling, as occurs when humectants are added to wood, paper, or other fibrous cellulosic materials. It is well-known, however, that chemical cross-linking reduces moisture absorption, and is therefore not a desirable method for stabilizing ink-receptive coatings.

In the case of ink absorbing layers, however, the addition of humectants to provide permanent swelling due to moisture saturation is not an acceptable means for imparting dimensional stability, since such saturation greatly reduces the ability of such a layer to absorb aqueous solvent.

The present invention provides improved materials for use in transparent ink-receptive layers. The improvements disclosed herein result in faster drying, lower tack of imaged sheets, and less curl of the sheets.

SUMMARY OF THE INVENTION

In one aspect, this invention provides compositions for preparing dimensionally stable, ink-receptive layers for transparent graphical materials, suitable for imaging by ink jet printers. The compositions used to form the ink-receptive layers comprise blends of at least one water-absorbing, hydrophilic, polymeric material, at least one hydrophobic polymeric material having acid functionality, and at least one polyethylene glycol. In another aspect, this invention provides transparent sheets, suitable for making visual transparencies, comprising a backing bearing on at least one major surface thereof a layer of the aforementioned ink-receptive composition. In a preferred embodiment, the ink-receptive layer is overcoated with an ink-permeable protective layer, which protective layer preferably contains a particulate material, e.g. starch.

The transparent sheet of this invention exhibits good dry time, good tack time, good image density, and a low level of film curl. Accordingly, the sheet is excellent for preparing transparencies for overhead projection by means of ink jet printers.

BRIEF DESCRIPTION OF THE DRAWING

The drawing is a cross-sectional view of a sheet suitable for visual transparencies according to the present invention.

DETAILED DESCRIPTION OF THE INVENTION

Referring now to the drawing, a sheet 10 suitable for preparing visual transparencies comprises a backing 12 bearing on at least one major surface thereof an ink-receptive layer 14. In the preferred embodiment, an ink-permeable protective layer 16 overlies ink-receptive layer 14. Contained in protective layer 16 is particulate material 18.

Ink-receptive layer 14 comprises a polymeric blend having as component (a) at least one water absorbing, hydrophilic, polymeric material, (b) at least one hydrophobic polymeric material incorporating acid functional groups, and (c) at least one polyethylene glycol.

The term "hydrophilic", as used herein, is used to describe a material that is generally receptive to water, either in the sense that its surface is wettable by water or in the sense that the bulk of the material is able to absorb significant quantities of water. More specifically, materials that exhibit surface wettability by water are said to have hydrophilic surfaces, while materials that have surfaces not wettable by water will be said to have hydrophobic surfaces. The term "water-absorbing hydrophilic materials", as used herein, is used to describe materials that are capable of absorbing significant quantities of water, including those that are water-soluble. When molecular structures are being discussed, monomeric units will be referred to as hydrophilic units if they have a water sorption capacity of at least one mole of water per mole of monomeric unit. Sorption capacities of various monomeric units are given, for example, in D. W. Van Krevelin, with the collaboration of P. J. Hoftyzer, *Properties Of Polymers: Correlations With Chemical Structure*, Elsevier Publishing Company (Amsterdam, London, New York: 1972) pages 294–296. Monomeric units will be referred to as hydrophobic if they form water-insoluble polymers capable of absorbing only small amounts of water when polymerized by themselves.

In cases where the blend is to be prepared by forming a solution containing components (a), (b), and (c), it is further desired that all three of components (a), (b), and (c) be soluble in a single solvent or blend of solvents. Solvents or blends of solvents useful for this purpose will hereinafter be called common solvents for the blend of components (a), (b), and (c). Solutions prepared by dissolving components (a), (b), and (c) in a common solvent will hereinafter be called solution blends of components (a), (b), and (c). Because the compositions for preparing ink-receptive layer 14 are preferably applied to backing 12 as liquid coatings that are subsequently dried to form ink-receptive layer 14, it is desired to form solution blends of components (a), (b), and (c).

Component (a), the water-absorbing hydrophilic polymeric material of ink-receptive layer 14, comprises polymerized combinations of monomeric units selected from the following:

(1) vinyl lactams having the repeat group structure:

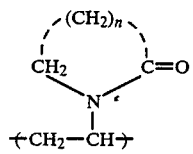

wherein n can be 2 or 3;

(2) alkyl tertiary amino alkyl acrylates or methacrylates having the structure:

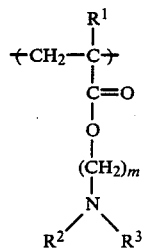

wherein m can be 1 or 2, $R^1$ represents hydrogen or —$CH_3$, $R^2$ represents hydrogen or an alkyl group having up to 10 carbon atoms, preferably 1 to 4 carbon atoms, and $R^3$ represents an alkyl group having up to 10 carbon atoms, preferably 1 to 4 carbon atoms;

(3) alkyl quaternary amino alkyl acrylates or methacrylates having the structure:

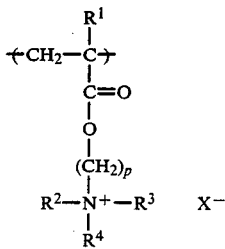

wherein p can be 1 or 2, $R^1$, $R^2$, and $R^3$ are as defined above, and $R^4$ represents an alkyl group having up to 10 carbon atoms, preferably 1 to 4 carbon atoms, and $X^-$ represents a halide ion, $R^2SO_4^-$, $R^3SO_4^-$, or $R^4SO_4^-$;

(4) 2-vinylpyridine; and (5) 4-vinylpyridine.

Polymerization of the foregoing monomers to form component (a) can be conducted by free-radical techniques, with time, temperature, proportions of monomeric units, and other conditions of polymerization adjusted to obtain the desired properties of the final product. Component (a) can be a homopolymer or a copolymer.

Component (b), the hydrophobic polymeric material of ink-receptive layer 14, is preferably derived from combinations of acrylic or other hydrophobic ethylenically unsaturated monomeric units copolymerized with monomeric units having acid functionality. Hydrophobic monomeric units suitable for preparing component (b) have the following characteristics:

(i) they would form water-insoluble polymers if polymerized by themselves;

(ii) they contain no pendant alkyl groups having more than 10 carbon atoms, preferably no more than 4 carbon atoms; and (iii) they are capable of being copolymerized with at least one species of acid-functional monomeric unit.

The hydrophobic monomeric units suitable for preparing component (b) are preferably selected from the following:

(1) acrylates and methacrylates having the structure

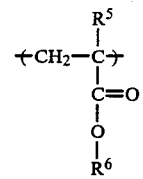

wherein $R^5$ represents hydrogen or —$CH_3$, and $R^6$ represents an alkyl group having up to 4 carbon atoms, preferably 1 or 2 carbon atoms, a cycloaliphatic group having up to 9 carbon atoms in the cyclic ring, such as, for example, isobornyl, a substituted or unsubstituted aromatic group such as, for example, benzyl, and an oxygen-containing heterocyclic group having up to 10 carbon atoms, such as, for example, tetrahydrofurfuryl;

(2) acrylonitrile;

(3) styrene or α-methylstyrene; and (4) vinyl acetate.

If $R^6$ is an aromatic group, it preferably contains only one aromatic ring. If $R^6$ is a substituted aromatic group, the substituents are preferably alkyl groups or substituted alkyl groups, preferably having up to four carbon atoms. Preferred substituents for the alkyl groups are halogens, such as, for example, bromine or chlorine.

Acid functional monomeric units suitable for preparing component (b) are preferably selected from acrylic acid and methacrylic acid, but other carboxylic acids capable of being copolymerized with the hydrophobic monomeric units described previously can also be used. When acrylic or methacrylic acid is used, the weight fraction of these acid units in the polymer chain can range from about 2% to about 20%, with the weight fraction of hydrophobic monomeric units ranging from about 98% to about 80%, with the preferred weight fraction for the acid functional groups ranging from 5% to 12%, with the preferred weight fraction for hydrophobic monomeric units ranging from 95% to 88%.

It is preferred that the glass transition temperature of component (b) be above about 20° C., and that the solubility properties of component (b) be such that a solution blend of components (a), (b), and (c) can be prepared in the same solvent or blend of solvents.

The polymeric materials comprising component (b) can be prepared by emulsion or solution polymerization of the foregoing monomers, using, for example, a free-radical initiator, and conventional means of extraction and drying. Component (b) can be a homopolymer or a copolymer.

Component (c), the polyethylene glycol of ink-receptive layer 14, is included for the purpose of curl reduction. It has been found that lower molecular weight polyethylene glycols are more effective than higher molecular weight polyethylene glycols for reducing curl and maintaining a low level of haze. For example, it was found that polyethylene glycol having a molecular weight of about 600 reduces curl to an acceptable level when present in an amount of only about 10% of the concentration of component (a) (when coated as a solution and dried for two minutes at 85° C.) whereas when polyethylene glycol having a molecular weight of about 4000 is used in the same polymeric blend and coated and dried under the same conditions, it must be added in the amount of 20% of the concentration of component (a) and that this higher amount of high molecular weight polyethylene glycol brings about noticeable haze in layer 14. Accordingly, it is preferred that the polyethylene glycol have a molecular weight of less than 4000. If the drying conditions are more severe, more polyethylene glycol may be needed to reduce curl.

The composition for forming ink-receptive layer 14 can be prepared by dissolving components (a), (b), and (c) in a common solvent, in the appropriate proportions. Well-known methods for selecting a common solvent often make use of Hansen parameters, which are quantities that characterize the individual contributions to cohesive energy density made by the intermolecular dispersion forces, dipole forces, and hydrogen bonding forces of a particular compound. Soluble solid materials tend to be more readily dissolved by liquids having Hansen parameters within a specified range of their own, this range being called the solubility envelope, and less readily dissolved by liquids having Hansen parameters outside of the solubility envelope. Because of this tendency, Hansen parameters can be used as a basis for selecting single solvents or for formulating solvent blends capable of dissolving a particular solid material or combination of solid materials.

Experimentally determined Hansen parameters and solubility envelopes for a variety of solid materials, along with Hansen parameters for many commonly used solvents, as well as formulas for mathematically estimating Hansen parameters of materials not listed, can be found in Barton, A. F. M. CRC *Handbook of Solubility Parameters and Other Cohesion Parameters*, CRC Press, Inc., (Boca Raton: 1983), incorporated herein by reference.

Systematic methods for utilizing Hansen parameters to compute solvent blend formulations capable of dissolving particular combinations of solid materials in more complicated systems may be found in Teas, J. P., "Solubility Parameters", *Treatise on Coatings*, R. R. Myers and J. S. Long, ed., Vol. 2, Part II, Marcel Dekker (New York: 1976), p. 413–448, incorporated herein by reference. Because such computational methods often result in more than one possible solvent formulation, additional experimental evaluation may be needed to arrive at an optimal formulation.

Additional constraints upon the choice of solvents may arise from practical requirements involving coating, drying, toxicity, and other considerations, as would be expected by one of ordinary skill in the art.

In the case of polymeric blends, polymers are generally said to be compatible if the composition resulting from the blending process appears homogeneous, the test for and definition of homogeneity depending upon the intended application of the blend. In the case of a transparent ink-receptive layer comprising polymeric blends, polymers forming the blend are said to be compatible if the resulting layer is optically clear, with little or no haze, e.g. equal to or less than about 15%, as measured in accordance with ASTM D1003-61(Reapproved 1977) and if images printed thereon appear uniform, without the appearance of undesirable patterns due to inhomogeneities in the ink-receptive layer.

Combinations of polymeric materials that are compatible upon blending include those that are miscible in one another due to a favorable free energy of mixing, as well as those which form association complexes, by, for example, hydrogen bonding between the different polymers. In these cases, compatibility means the absence of domains of differing refractive indices of sufficient magnitude to cause visible haze. When polymers having refractive indices which are of nearly equal value are blended, the presence of separate domains may not manifest itself as haze, because if the refractive indices of the two polymers are nearly equal, the variations in refractive index due to inhomogeneity will be low. After imaging, however, the presence of separate, phase-separated domains may manifest itself by uneven edges, non-uniform lateral ink migration, or non-uniform image appearance in areas of solid color.

Solution blends of components (a), (b), and (c) can be conveniently applied to backing by conventional coating techniques, such as a Mayer bar coating, knife coating, reverse roll coating, rotogravure coating, or other suitable coating methods. Drying of the coated solution is preferably conducted with heated air.

In embodiments of the present invention wherein an ink-permeable protective layer 16 is applied, the preferred material for layer 16 is polyvinyl alcohol. Layer 16 can also include particulate material for the purpose of improving handling and flexibility, the preferred particulate material being starch. Other materials suitable for layer 16 of this invention are disclosed in U.S. Pat. No. 4,225,652, U.S. Pat. No. 4,301,195, and in U.S. Pat. No. 4,379,804, all of which are incorporated herein by reference.

The composition for forming the protective layer 16 is preferably prepared by dispersing finely divided polyvinyl alcohol in cold water, agitating the dispersion rigorously, and then gradually heating the dispersion by an external source or by direct injection of steam, as described, for example, in Monsanto Technical Bulletin No. 6082F, incorporated herein by reference. After cooling the dispersion to room temperature, particulate material 18, e.g. starch, can be added to the dispersion with mixing. Mixing can be conducted with a conventional propeller type power-driven mixing apparatus. The preferred mean particle diameter for particulate material 18 is in the range of 5 to 25 micrometers, provided that at least 25% of the particles have a diameter of 15 micrometers or greater. The amount of particulate material 18 that can be present is limited by the requirement that the final coating be transparent, with a haze level of equal to or less than about 15%, as measured according to ASTM D1003-61 (Reapproved 1977). Starch can be either unmodified natural starch or modified starch, as described in *Modified Starches: Properties And Uses*, O. B. Wurzburg, ed., CRC Press, Inc. (Boca Raton: 1986) provided that the particles remain insoluble in the coating solution at the temperatures used in the coating process.

Additives can be incorporated into the coating solution for layer 16 for the purpose of improving coatability and other processing features. In particular, thickeners, such as xanthan gum, can be added to the solution to aid in the dispersion of the particulate material and to improve coatability.

Protective layer 16 can be applied in solution form by means of such coating methods as Mayer bar coating, knife coating, reverse roll coating, rotogravure coating, or other suitable coating means. Drying of the coated solution is preferably conducted by heated air.

Suitable materials for backing 12 are preferably transparent and flexible. Suitable polymeric materials include polyethylene terephthalate (PET), cellulose acetates, polystyrene, polyethylene, polypropylene, polycarbonate, and other like materials, with PET being preferred. It is preferred that backing be provided as a film having a caliper ranging from about 50 micrometers to about 125 micrometers. Film backings having a caliper less than 50 micrometers are difficult to handle in the manner customary for graphical materials, and film backings having calipers over 125 micrometers are so stiff that they present feeding difficulties in some commercially available ink jet printing machines.

In order to improve adhesion of ink-receptive layer 14 to backing 12, a priming layer (not shown) can be interposed between these two layers. It is preferred that the material of priming layer not be sensitive to water. Alternatively, a surface modification, such as corona treatment or plasma treatment, can be applied to one or both major surfaces of backing 12, for the purpose of improving adhesion of ink-receptive 14 layer to backing 12.

Sheets 10 of the present invention are typically tested for the following characteristics: dry time, tack time, image density, and film curl. Methods of testing for these characteristics are described below.

Dry Time

An image printed by an ink jet printer may be considered to be dry when, upon pressing a sheet of bond paper against the imaged area, ink does not transfer to the paper. Samples for testing of the time required for drying (dry time) may be prepared by first preconditioning the samples to be tested by placing them in an environment having a temperature of 21° C. and 50% relative humidity for 24 hours, then printing onto the sample, by means of a commercially available color ink jet printer, a test pattern that includes large areas of solid color as well as narrower lines, in all of the colors printable by the printer. A suitable test for dry time may then be performed by placing the imaged sample on a flat surface large enough to completely support it, placing a 0.5 inch wide strip of bond paper in contact with the area to be tested, such that the paper contacts areas containing all of the colors printed by the printer, and pressing the strip into intimate contact with the imaged sheet by means of a rubber roller having a width of about 6 inches, a diameter of about 2 inches, a Shore hardness of about 50 on the durometer A scale, and weight of about 600 to 700 grams. After one pass of the roll, the strip of paper is removed and examined for ink transfer. If no ink has transferred to the paper, the image is considered to be dry. If ink transfer to the paper is detected, the test is repeated 60 seconds later, and at subsequent 60 second intervals until no transfer is detected. Dry time is reported as the total time interval after imaging at which no ink transfer to the paper is detected. If ink transfer is still detected 5 minutes after imaging, the test may be terminated and the dry time simply reported as greater than 5 minutes, since dry times of more than 5 minutes are unacceptable.

Tack Time

Tack time, as used herein, is a measure of the time required for the image to dry to a point where unprimed polyethylene terephthalate (PET) film, upon being pressed against the imaged area, will no longer adhere to it. It has been found that the test for tack time may be applied to the sample prepared and tested for dry time described hereinabove. After dry time has been determined, a strip of 100 micrometer caliper unprimed PET film having dimensions of 3 inch × 9 inch is placed in contact with the imaged surface. The PET strip is pressed into intimate contact with the film by means of the roller described previously. If the resulting adhesion of the test strip to the image surface is sufficiently low to allow the test strip to be lifted from the imaged sheet without having to physically hold down the imaged sheet, the tack is considered to be acceptably low. The tack test is performed at regular time intervals after completion of the dry time test, and tack time is reported as the total time interval from the time of imaging to the time at which tack becomes acceptably low.

Image Density

Image density can be measured by means of the Macbeth TD 903 densitometer, or equivalent instrument, using the status A filters, as is common practice when testing color positive films. Samples may be prepared for testing by first preconditioning at 21° C. and 50% relative humidity for 24 hours, then imaging solid areas of cyan, magenta, yellow, and black. Densities are measured using the green filter for the magenta area, the red filter for the cyan area, the blue filter for the yellow area, and the red filter for the black area, according to the procedure given in the instructions accompanying the densitometer. Because image density has been found to change with time, densitometer readings are normally taken at times of 10 minutes, 30 minutes, and 24 hours after imaging.

Film Curl

Film curl is commonly measured by preparing a sample of the film to be tested having dimensions of 8.5 inch × 11 inch and placing this sample upon a flat surface of a size sufficiently large to completely support the film sample, in such a way that when curl occurs, the edges of the film lift up. Curl, measured in millimeters, is then defined to be the maximum height above the flat surface reached by any point along the periphery of the film as a result of curling. This test is commonly run at 21° C. and a relative humidity of 50%.

Other aspects of image quality may be evaluated by printing appropriate test patterns on the sample sheet being tested and judging such properties as image uniformity, bleeding of one color into a sharply defined area of another color, fingerprinting, and marking or blemishing produced by the imaging process itself or by the normal handling encountered in the use of graphic materials. Such judgments can be made by direct viewing or by viewing in a projection mode, by means, for example, of an overhead projector.

The following, non-limiting examples further illustrate the present invention.

EXAMPLE 1

Component (b), the hydrophobic polymeric material for ink-receptive layer 14, was prepared by combining 91 parts by weight of methyl methacrylate, 9 parts by weight of acrylic acid, 0.15 part by weight of azoisobutyronitrite ("Vazo", available from E. I. DuPont de Nemours & Company), and 200 parts by weight of ethyl acetate in a one-pint brown bottle. The mixture was purged with dry nitrogen gas for five minutes and then immersed in a constant temperature bath maintained at 60° C. for 18 to 24 hours. The resulting methyl methacrylate/acrylic acid copolymer was coagulated in methanol, filtered, and dried in a vacuum oven at 50° C. for 18 hours. Comparison of the final polymer weight with the weight of the starting materials showed a yield of better than 97%.

A coating solution for the preparation of ink-receptive layer 14 was prepared by combining 270 parts by weight of ethanol and 630 parts by weight of ethyl acetate, to which was added, with agitation at room temperature, 65 parts by weight of component (a), i.e. poly-N-vinyl pyrrolidone (K90, available from GAF Chemicals Corporation), 6.25 parts by weight of component (c), i.e. polyethylene glycol ("Carbowax 600", available from Union Carbide Corporation), and 28.15 parts of component (b), prepared as described previously. Agitation was continued until a clear solution was obtained.

A layer of this solution having 75 micrometer wet thickness was coated onto a sheet of polyvinylidene chloride primed polyethylene terephthalate ("Scotchpar", available from Minnesota Mining and Manufacturing Company) having a caliper of 100 micrometers by means of a knife coater. Drying of the layer was conducted by means of heated air at a temperature of 85° C. for two minutes. Samples of coated film having dimensions 8.5 inches×11 inches were cut from this sheet and conditioned at 21° C. and 50% relative humidity for 24 hours.

The conditioned sheets were imaged with a Hewlett-Packard Paintjet ink jet printer, using the standard cyan, magenta, yellow, and black ink supplied therewith, and the image evaluation test pattern described previously. The imaged sheets were tested for dry time, tack time, image density, film curl, fingerprinting, image uniformity, and image bleed. Film curl was found to be zero, and drying was nearly complete after 60 seconds. However, the imaged sheet remained tacky even after 24 hours, and was easily fingerprinted. Image density was within the acceptable range, and image uniformity was excellent.

Comparative Example A

A coating solution for the preparation of ink-receptive layer 14 was prepared as in Example 1, but without polyethylene glycol. A sample of coated film was prepared with this polyethylene glycol-free coating solution, according to the procedure of Example 1. Measurement of film curl showed the highest point on the film to be elevated 15 millimeters above the flat surface. This was considered to be a very severe curl and the film would not be acceptable for use as a visual transparency for overhead projection. This comparative example illustrates the effectiveness of polyethylene glycol in the prevention of curl in coated films.

EXAMPLE 2

A coating solution for protective layer 16 for a visual transparency according to the present invention was prepared by dispersing 2.9 parts by weight of polyvinyl alcohol ("Vinol 540", available from Air Products and Chemicals) in about 40.0 parts by weight of room temperature deionized water, and then bubbling steam through this mixture until a clear solution was obtained. Additional room temperature deionized water as needed was then added to the solution to bring the total water content up to 65.8 parts by weight. This solution was further diluted by the addition of 30.8 parts by weight of ethanol. Finally, 0.15 part by weight of xanthan gum thickener ("Keltrol TF", available from Kelco Division of Merck and Company) and 0.40 part by weight of cationic starch ("Lok Size 30", available from A. E. Staley Manufacturing Company) were added and mixed until the xanthan gum was dissolved and the starch was uniformly dispersed.

This solution was applied over ink-receptive layer 14 of sheet 10 prepared according to Example 1, so as to form an ink-permeable protective layer 16 over ink-receptive layer 14 formed according to Example 1. Application of protective layer 16 was carried out by means of a knife coater, adjusted so as to apply the coating at a rate sufficient to result in a coating weight, after drying, of 0.05 to 0.07 gram per square foot. Drying was carried out by heated air at a temperature of 85° C. for two minutes. Samples were prepared for evaluation by cutting the coated film into sheets having dimensions of 8.5 inches ×11 inches and conditioning these sheets at 21° C. and 50% relative humidity for 24 hours.

The conditioned sheets were imaged using a Hewlett-Packard Paintjet ink jet printer, using the image evaluation test pattern described previously, and tested in the manner described in Example 1. Dry time and tack time were both 60 seconds, which was considered to be excellent. Slight fingerprinting was noted, but was considered to be within acceptable limits. Image density, image uniformity, and image bleeding were found to be within acceptable limits.

Various modifications an alterations of this invention will become apparent to those skilled in the art without departing from the scope and spirit of this invention and it should be understood that this invention is not to be unduly limited to the illustrative embodiments set forth herein.

What is claimed is:

1. A transparent sheet suitable for making visual transparencies comprising a thin, transparent backing bearing on at least one major surface thereof an ink-receptive layer comprising a transparent composition comprising a blend of (a) at least one water-absorbing, hydrophilic, polymeric material, (b) at least one hydrophobic polymeric material having acid functionality, and (c) at least one polyethylene glycol, said composition having a haze value equal to or less than about 15%, as measured in accordance with ASTM D1003-61 (Reapproved 1977).

2. The transparent sheet of claim 1 wherein said water absorbing polymeric material is derived from monomeric units selected from the group consisting of:
 (1) vinyl lactams having the structure

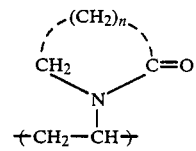

wherein n can be 2 or 3;
 (2) alkyl tertiary amino alkyl acrylates having the structure

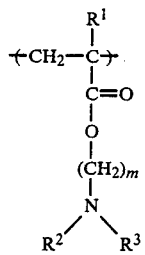

wherein m can be 1 or 2, $R^1$ represents hydrogen or —$CH_3$, $R^2$ represents hydrogen or an alkyl group having up to 10 carbon atoms, and $R^3$ represents an alkyl group having up to 10 carbon atoms;

(3) alkyl quaternary alkyl acrylates having the structure

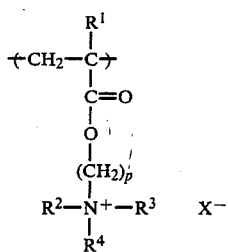

wherein p can be 1 or 2, $R^1$, $R^2$, and $R^3$ are as defined above, $R^4$ represents an alkyl group having up to 10 carbon atoms, and $X^-$ represents a halide ion, $R^2SO_4^-$, $R^3SO_4^-$, or $R^4SO_4^-$;

(4) 2-vinylpyridine; and (5) 4-vinylpyridine.

3. The transparent sheet of claim 2 wherein $R^2$ represents hydrogen or an alkyl group having up to 4 carbon atoms.

4. The transparent sheet of claim 2 wherein $R^3$ represents an alkyl group having up to 4 carbon atoms.

5. The transparent sheet according to claim 2 wherein $R^4$ represents an alkyl group having up to 4 carbon atoms.

6. The transparent sheet of claim 1 wherein said hydrophobic monomeric units are selected from the group consisting of (1) acrylates and methacrylates having the structure

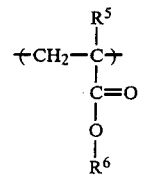

wherein $R^5$ represents hydrogen or —$CH_3$, and $R^6$ represents an alkyl group having up to 4 carbon atoms, a cycloaliphatic group having up to 9 carbon atoms in the cyclic ring, a substituted or unsubstituted aromatic group, and an oxygen-containing heterocyclic group having up to 10 carbon atoms;

(2) acrylonitrile;

(3) styrene;

(4) α-methylstyrene; and (5) vinyl acetate.

7. The transparent sheet of claim 6 wherein $R^6$ represents an alkyl group having 1 or 2 carbon atoms.

8. The transparent sheet of claim 6 wherein $R^6$ represents an isobornyl group.

9. The transparent sheet of claim 6 wherein $R^6$ represents a benzyl group.

10. The transparent sheet of claim 6 wherein $R^6$ represents a tetrahydrofurfuryl groups.

11. The transparent sheet of claim 1 wherein said at least one hydrophobic polymeric material having acid functionality is a copolymer prepared from hydrophobic monomeric units and acrylic acid or methacrylic acid monomeric units, said acid monomeric units comprising from about 2% by weight to about 20% by weight of said copolymer.

12. The transparent sheet of claim 1 wherein said at least one hydrophobic polymeric material having acid functionality is a copolymer prepared from hydrophobic monomeric units and acrylic acid or methacrylic acid monomeric units, said acid monomeric units comprising from about 5% by weight to about 12% by weight of said copolymer.

13. The transparent sheet of claim 1 wherein said polyethylene glycol has a molecular weight of less than 818 4000.

14. A transparent sheet of claim 1 wherein overlying said ink-receptive layer is an ink-permeable protective layer.

15. The transparent sheet of claim 15 wherein said protective layer contains particulate material.

16. The transparent sheet of claim 15 wherein said particulate material is starch.

* * * * *